(12) United States Patent
Olomski

(10) Patent No.: US 8,143,827 B2
(45) Date of Patent: Mar. 27, 2012

(54) ERROR RECOGNITION BY EVALUATION OF PARAMETERS OF THE FIELD ORIENTED REGULATION

(75) Inventor: Jürgen Olomski, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 415 days.

(21) Appl. No.: 12/311,148

(22) PCT Filed: Aug. 24, 2007

(86) PCT No.: PCT/EP2007/058795
§ 371 (c)(1),
(2), (4) Date: Mar. 19, 2009

(87) PCT Pub. No.: WO2008/037551
PCT Pub. Date: Apr. 3, 2008

(65) Prior Publication Data
US 2010/0001669 A1 Jan. 7, 2010

(30) Foreign Application Priority Data
Sep. 26, 2006 (DE) .................. 10 2006 045 397

(51) Int. Cl.
*H02P 6/06* (2006.01)
*H02P 7/00* (2006.01)

(52) U.S. Cl. .............. 318/400.06; 318/400.21; 318/432; 318/434

(58) Field of Classification Search ............. 318/400.06, 318/400.21, 430, 432, 434
See application file for complete search history.

(56) References Cited

U.S. PATENT DOCUMENTS

| | | | | | |
|---|---|---|---|---|---|
| 4,156,162 | A | * | 5/1979 | Warfield et al. | 318/434 |
| 5,652,491 | A | * | 7/1997 | Ikawa et al. | 318/632 |
| 6,046,893 | A | * | 4/2000 | Heravi | 361/23 |
| 6,822,416 | B1 | | 11/2004 | Kunz et al. | |
| 2004/0257027 | A1 | | 12/2004 | Matsuo et al. | |
| 2005/0140324 | A1 | | 6/2005 | Kunzel et al. | |
| 2009/0267554 | A1 | * | 10/2009 | Mori et al. | 318/432 |

FOREIGN PATENT DOCUMENTS

| | | |
|---|---|---|
| EP | 0633653 A1 | 1/1995 |
| EP | 0690556 A1 | 1/1996 |
| EP | 1311047 A2 | 5/2003 |

\* cited by examiner

*Primary Examiner* — Derek Rosenau

(57) ABSTRACT

A drive device having an electric motor with a device for field oriented control of the electric motor and a method for operation thereof is disclosed. An error monitoring of a transducer on the electric motor is achieved by a comparator device for comparing a transducer signal of the transducer on the electric motor with a calculated parameter of the field oriented control, the comparator device recognizing a transducer error and/or a coupling error. The coupling error relates to a coupling for mounting the transducer on the electric motor.

15 Claims, 2 Drawing Sheets

US 8,143,827 B2

ERROR RECOGNITION BY EVALUATION OF PARAMETERS OF THE FIELD ORIENTED REGULATION

CROSS REFERENCE TO RELATED APPLICATIONS

This application is the US National Stage of International Application No. PCT/EP2007/058795 filed Aug. 24, 2007 and claims the benefit thereof. The International Application claims the benefits of German Patent Application No. 10 2006 045 397.2 DE filed Sep. 26, 2006, both of the applications are incorporated by reference herein in their entirety.

FIELD OF INVENTION

The invention relates to a drive device and a method for operation of a drive device. The purpose of such a drive device or method is to detect errors caused by, for instance, a coupling failure or a transducer error.

BACKGROUND OF INVENTION

Electric motors are regulated with the aid of transducers which deliver values such as an actual speed, an acceleration table or an actual position for controlling and regulating the electric motor. Such signals referring to position, speed or acceleration can contain errors, giving rise to a transducer error. Transducer errors can be caused for example by a coupling failure, that is, a failure in the attachment of the transducer to an axis of the electric motor, or by an error in the transducer itself. In the case of the transducer itself, the transducer electronics or a transducer disk may possibly be defective.

The drive device relates in particular to a drive device for a machine tool or a production line. When machine tools or production lines are being monitored for safety, it is generally the case that transducer couplings and transducer mechanics in the system are not monitored on a redundant basis, since such devices tend to be extremely failsafe. The transducer mechanics relate in particular to a transducer disk. In the case of machine tools and production lines, however, the significance of safety engineering is continually on the increase. This leads to the concept that the catchword "safety integrated" holds increasing significance for users of machine tools and production lines. In particular, monitoring of the transducer mechanics or transducer coupling is increasingly required as part of the often quite costly certification.

SUMMARY OF INVENTION

Since advantageously the drive device is as simple and cost-effective as possible to produce, it follows that monitoring for an error in the transducer or a coupling also needs to be provided in a simple and cost-effective manner. Furthermore error monitoring should also be as accurate and fast as possible.

This object is inventively achieved by a drive device and a method as claimed in the independent claims. The dependent claims represent inventive developments of the device or method.

A drive device of an electric motor has a device for field oriented regulation of the electric motor. Moreover the drive device can be assigned a rectifier and a transducer for the electric motor. The electric motor can be operated by means of a rectifier connected to said motor. The electric motor can be controlled or regulated via the rectifier by means of the field oriented regulation. The rectifier can be embodied as a rectifier device wherein a control and/or regulation device is integrated, by means of which the field oriented regulation can be executed. The transducer of the drive device is coupled to a shaft of the electric motor either directly or by means of a coupling, for example. The transducer is connected to a transducer shaft of the electric motor according to the prior art, said connection being located on a drive side of the electric motor. The configuration and structure of the field oriented regulation are known from document EP 0469177 B1 for example. This regulation is a vectorial regulation having a frequency channel, an amplitude channel and an actual value calculator. The frequency channel is provided with a switch on both the input and the output side. The actual value calculator uses the actual values for motor current $i_{R,S,T}$ and motor voltage $U_{R,S,T}$ to calculate the field oriented current components $i_\mu$ and $i_w$ and an actual speed value $n_{ist}$. The current vector $i_w$ is fed to the frequency channel together with the actual speed value $n_{ist}$ that has been determined. A frequency reference value $f_{St}$ is present at the output from the frequency channel, and an amplitude reference value $u_{St}$ is present at the output from the amplitude channel. These reference parameters $u_{St}$ and $f_{St}$ are fed to a gate control unit which uses them to generate control pulses for the rectifier.

The drive device is designed so that it has a comparator device for comparing a transducer signal from the transducer with a parameter from the field oriented regulation. The transducer signal generated by the transducer relates for example to the speed, position or acceleration of the shaft in the electric motor. The parameter from the field oriented regulation therefore relates to a corresponding equivalent of the transducer signal. Such an equivalent would be for example the speed, frequency or acceleration of the shaft in the electric motor. A value for position can also be deduced from parameters of the field oriented regulation. When using a parameter from the field oriented regulation it must always be noted that in appropriate cases a conversion must be made between electrical and mechanical parameters. This conversion depends in particular on the type of electric motor used. The number of pole pairs in a stator winding or rotor has a part to play in this. Consideration must also be given to whether the electric motor is synchronous or asynchronous. Dependent on this, there will be differences in the field oriented regulation.

Examples of a field oriented regulation for asynchronous motors are known for example from patent applications EP 0 633 653 A1 and EP 0 690 556 A1. Field oriented regulations are also used in synchronous motors. The conference report "Position-sensorless control of direct permanent magnet synchronous motors for railway traction" (Proceedings PESC 04 Conference, Aachen, June 2004) shows further block diagrams for field oriented regulations.

Field oriented regulations of electric motors can be embodied as vectorial regulations, for example, having a frequency channel, an amplitude channel and an actual value calculator. The actual value calculator uses the actual values for motor current $i_{R,S,T}$ and motor voltage $U_{R,S,T}$ to calculate the field oriented current components $i_\mu$ and $i_w$ and an actual speed value $n_{ist}$. The current vector $i_w$ is fed to the frequency channel together with the actual speed value $n_{ist}$ that has been determined or calculated. A frequency reference value $f_{St}$ is present at the output from the frequency channel, and an amplitude reference value $u_{St}$ is present at the output from the amplitude channel. These reference parameters $u_{St}$ and $f_{St}$ are fed to a gate control unit which uses them to generate control pulses for an inverter.

The comparator device is advantageously provided for recognition of a transducer error and/or a coupling error. The error is determined by comparing the actual transducer value recorded by a transducer of the electric motor with an actual transducer value calculated from the field oriented regulation. Then for example a value for the difference is derived from the actual values and compared with a threshold value. If a predetermined threshold is exceeded, an error is recognized. The calculated actual transducer value is thus a calculated actual speed value or a calculated actual position value, for example.

There are many examples of field oriented regulations. For example a means can be provided for detecting the reactive power and active power of an electric motor (induction motor), wherein the principal relationship $\hat{\epsilon}=\arctan(P_B/P_W)$ (where $P_B$ is the reactive power and $P_W$ is the active power of the instantaneous stator current angle) is determined in an arithmetic logic unit in such a way that a signal corresponding to the difference between the nominal stator current angle and the stator current angle determined from the above relationship is forwarded to a field angle controller. The output signal, together with a signal corresponding to the slippage of the induction motor, specifies a nominal frequency for the further converter, wherein the output signal from the field angle controller acts as a speed regulation parameter corresponding to the actual speed of the induction motor. This parameter is calculated from the field oriented regulation and can be compared with a parameter generated by a transducer.

In the case of the field oriented regulation for asynchronous motors, the actual frequency of the motor and the actual speed of the motor are linked by a proportionality factor. It is then possible to forward the output signal from the field angle controller to a converter at whose output the actual speed, which can be forwarded to a speed controller, is then present. A calculated speed value can thus be obtained by the field oriented regulation in the case of both synchronous and asynchronous motors.

The comparator device can advantageously be integrated into a device (also known as an apparatus) for controlling and/or regulating the electric motor. This device is advantageously provided for executing the field oriented regulation. All of these items can consequently be integrated into a rectifier.

In order to monitor errors such as a coupling error or a mechanical transducer error, caused for example by transducer disk slippage, a drag distance check can be carried out. In a drag distance check, a mathematically theoretical target position obtained from the position controller is compared with an actual position which can be determined by means of an actual transducer value. If the difference between the two values exceeds a certain limit value, an error message (drag error) is generated. Using the position controller, however, results in inaccuracies and delays in the detection of a transducer error. It is possible to dispense with the use of a value from the position controller or even from the speed controller. It is possible to use a value obtained directly from the field oriented regulation.

In a further embodiment of the field oriented regulation, for the purpose of directly regulating the output currents of an inverter feeding an induction motor without actual speed value transducers it is possible to design a current reference parameter generator in such a way that said parameter generator uses the actual values of the inverter output currents, the switching states of the rectifier valves of the inverter and a desired speed value to create a three phase, sinusoidal current reference parameter system that is fed to a subordinate current controller. An actual value calculator of a current reference parameter generator first of all uses the inverter output currents (phase currents of the induction motor), the switching states of the rectifier valves of the inverter and the determined current amplitude of the current reference parameters to calculate the actual values of the active and reactive currents fed to the induction motor, which are then transformed into a torque-forming and a flux-forming current component. The torque-forming and flux-forming current reference parameter values are separately generated with the aid of these field oriented parameters. Moreover a generated acceleration signal can be used to ascertain the actual speed value needed for determining the reference value of the torque forming current component. In this way said current reference parameter generator, using the field oriented regulation together with only the actual values of the inverter output currents and the switching states of the valves of said inverter, can be used to generate a current reference parameter system for a subordinate current controller, whereby an induction motor can be controlled in a simple manner without the detection of an actual speed value, a very good true running characteristic being achieved even at low speeds. If in addition a transducer is then used to regulate the electric motor (induction motor), for example in order to improve the accuracy of the regulation, the transducer can be monitored by means of the calculated actual speed value.

According to the method for operating a drive device having in particular:
  an electric motor,
  a transducer for the electric motor,
  a rectifier and
  a device or apparatus for executing a field oriented regulation,
a transducer signal from the transducer is compared with a parameter from the field oriented regulation. This parameter is an actual speed value calculated from actual current values and further parameters of the regulation, for example. The transducer signal is transmitted to a comparator device, for instance, where it is compared with the parameter from the field oriented regulation. This comparison is then used to detect such errors as:
  a transducer error and/or
  a coupling error.

A coupling error can occur in a drive device equipped with a coupling, wherein the coupling has a driving end and a driven end, and the transducer is positioned on the driven end of the coupling, since the electric motor is located on the driving end of the coupling. In the event of a transducer or coupling error, the calculated actual speed value departs from the actual speed value measured by the transducer.

Advantageously parameters/values are compared in a comparator device which is integrated into a control and/or regulation device of the rectifier, said comparison being performed by means of said control and/or regulation device.

Furthermore it is advantageous if the comparator device is activated with effect from a minimum speed. This can prevent an error message being generated in, for example, an unregulated idle state of the electric motor. Error monitoring is therefore coupled to activation of the speed and/or position regulation of the electric motor.

If an illegal deviation between the two compared parameters (measured or calculated) is detected by the comparator device, an emergency cutoff can be activated immediately. Then for example:
the electric motor is powered down to a ramp by means of the calculated actual speed value, or
a firing pulse lock is triggered for the rectifier.

In an advantageous embodiment the transducer error is checked within a specifiable checking phase. In this checking phase a defined path or defined rotation is traveled (for example via two cams) in order to check or align the model (current and/or voltage model). It would then be possible to easily detect a slight slippage in a coupling or in a transducer disk of the transducer, for example. The purpose of the coupling is to connect the transducer disk to a transducer shaft of the electric motor.

In a further advantageous embodiment of the electric motor, said motor has additional windings and/or further sensors for measuring the position or speed of the rotor. If these latter are used to check the transducer signal on a redundant basis, they need a resolution appropriate to said transducer signal.

BRIEF DESCRIPTION OF THE DRAWINGS

For a more detailed explanation of the invention, reference will be made to the drawing, which schematically illustrates exemplary embodiments of the invention. These show the following.

DETAILED DESCRIPTION OF INVENTION

Figure 1:
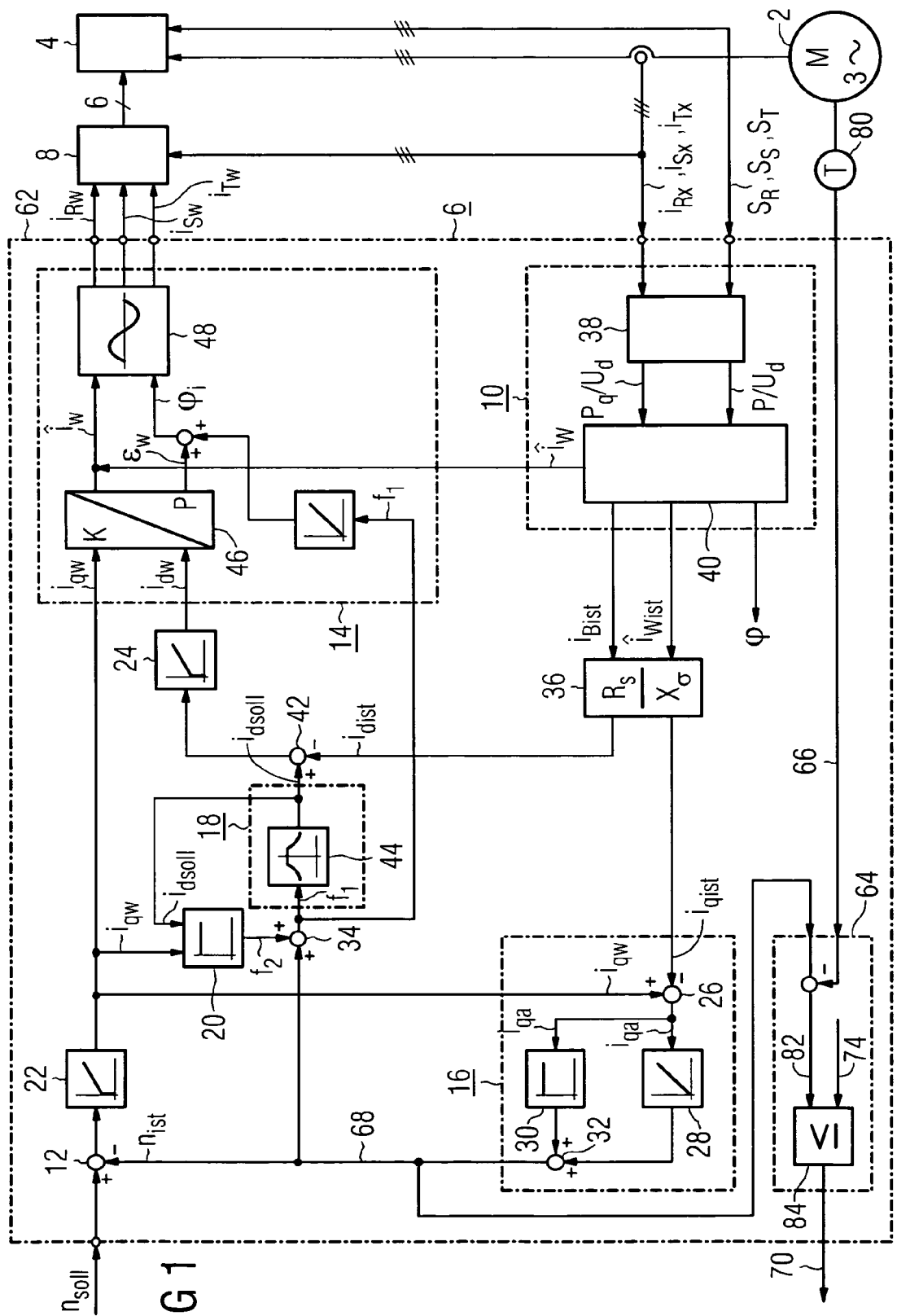
FIG. 1 a structure of a regulation in which an actual speed value is calculated, and FIG. 2 a drive device.

The same reference characters are used to designate the same objects in the figures.

FIG. 1 shows a circuit arrangement for a field oriented regulation for directly regulating inverter output currents $i_{Rx}$, $i_{Sx}$ and $i_{Tx}$ of a converter feeding an induction motor 2. A device 62 provided for control and/or regulation has the appropriate controllers. For clarity, only the line side inverter 4 of one converter is shown. A suitable converter would be an intermediate voltage circuit converter or an intermediate current circuit converter. The line side inverter 4 is designed with rectifier valves that can be disabled. Suitable rectifier valves that can be disabled would be transistors or gate turn off thyristors (GTO thyristors). The switching states of these valves are displayed with the aid of the switching state signals $S_R$, $S_S$ and $S_T$.

The regulation consists of a current reference parameter generator 6 and a subordinate current controller 8. The current reference parameter generator 6 uses the inverter output currents $i_{Rx}$, $i_{Sx}$ and $i_{Tx}$ together with a specifiable desired speed value $n_{soll}$ and the switching state signals $S_R$, $S_S$ and $S_T$ to create for example a three phase, sinusoidal current reference parameter system $i_{Rw}$, $i_{Sw}$ and $i_{Tw}$ for the subordinate current controller 8. The actual values of the inverter output currents $i_{Rx}$, $i_{Sx}$ and $i_{Tx}$ are also fed to this subordinate current controller 8, the valves of the inverter 4 being controlled by comparing reference values $i_{Rw}$, $i_{Sw}$ and $i_{Tw}$ with actual values $i_{Rx}$, $i_{Sx}$ and $i_{Tx}$. Input side the current reference parameter generator 6 consists of an actual value calculator 10 and a first comparator 12 and output side consists of a transformation device 14. This reference parameter generator 6 also contains an actual speed value model 16, a flux-forming current component desired value generator 18, slippage compensation 20, a speed controller 22 and a flux-forming current component controller 24. Present on the positive input of the first comparator 12 is a predetermined desired speed value $n_{soll}$ while on its negative input is a simulated actual speed value $n_{ist}$ formed with the aid of the actual speed value model 16.

The actual speed value $n_{ist}$ is fed to a comparator device 64 as a calculated parameter 68. A transducer 80 is provided for detecting the speed of the electric motor 2. A transducer signal 66 of the transducer 80 forms an input signal of the comparator device 64. The transducer signal 66 is processed in said device along with the calculated speed parameter 68. In the present example this is done by subtraction. A resulting difference parameter 82 is compared with a threshold 74 by a comparator 84. If the difference parameter 82 exceeds the set or adjustable threshold, an error signal 70 is generated.

A reference value of the torque-forming current component $i_{qw}$ is formed with the aid of the speed controller 22 from the speed difference at the output of the comparator 12. This torque-forming current reference value component $i_{qw}$ is fed on the one hand to a positive input of the actual speed value model 16 and the slippage compensation 20, and on the other to a first input of the output side transformation device 14. Present on the negative input of the actual speed value model 16 is a determined actual value of the torque-forming current component $I_{qist}$.

The positive and negative inputs of the actual speed value model 16 belong to an input side comparator 26, which forms the difference $i_{qa}$ from the reference value and from the actual value of the torque-forming current components $i_{qw}$ and $i_{qist}$. These current components $i_{qw}$ and $i_{qist}$ are equivalent to the motor torque and the load torque. Thus the current component difference $i_{qa}$ is equivalent to the torque difference. This torque difference is the same as an acceleration torque. The value $i_{qa}$ equivalent to the current component difference is fed to an integrally acting controller 28 and a proportionally acting controller 30. The outputs of these controllers 28 and 30 are summed by an adder 32, at whose output the simulated actual speed value $n_{ist}$ is permanently present. Use of the proportionally acting controller 30 significantly improves the dynamic behavior of the drive. This actual speed value $n_{ist}$ is also fed to a further adder 34, at whose second input the slippage frequency $f_2$ is present. The output of this adder 34 delivers the stator frequency $f_1$, which is fed to the output side transformation device 14. The actual value of the torque-forming current component $i_{qist}$ is one of the two field oriented parameters generated with the aid of the input side actual value calculator 10 and a downstream transformation device 36 from the inverter output currents $i_{Rx}$, $i_{Sx}$ and $i_{Tx}$ together with the switching state signals $S_R$, $S_S$ and $S_T$ of the inverter valves.

The actual value calculator 10 comprises an activity recorder 38 and an actual value computational device 40. Present on the outputs of this activity recorder 38 are the active power and reactive power $P/U_d$ and $P_q/U_d$ referenced to the intermediate circuit voltage $U_d$. The actual value computational device 40 uses this information to calculate the actual values of the active and reactive currents $i_{Wist}$ and $i_{Bist}$ as well as the phase angle 9, which are fed to the motor 2. These actual values can be calculated. The actual values of the torque-forming and flux-forming current components $i_{qist}$ and $i_{dist}$ of the motor current are formed from the actual values of the active and reactive currents $i_{Wist}$ and $i_{Bist}$ via a transformation which takes into account the winding resistance $R_S$ of the stator winding and the scattering X. The actual value of the flux-forming current component $i_{dist}$ is fed to a negative input of a further comparator 42, on whose positive input the desired value of the flux-forming current component $i_{dsoll}$ is present. This desired value $i_{dsoll}$ is derived via a characteristic of the output frequency (stator frequency) $f_1$. Hence the stator frequency $f_1$ that has been formed is fed to a load-independent desired value generator 44 of the flux-forming current component desired value generator 18, on whose output the desired value of the flux-forming current component $i_{dsoll}$ is then present. This desired value $i_{dsoll}$ is also fed to the slippage compensation 20. The reference value of the flux-forming current component $i_{dw}$ is generated from the difference between the desired value $i_{dsoll}$ and the actual value $i_{dist}$ with the aid of the current controller 24.

First the quantity $\hat{i}_w$ and the load angle $\epsilon_w$ are formed with the aid of the transformation device 14 from the field oriented reference parameters $i_{qw}$ and $i_{dw}$ together with the stator frequency $f_1$. The quantity $\hat{i}_w$ and the load angle $\epsilon_w$ are obtained with the aid of a C/P converter 46 (Cartesian/polar) from the field oriented current components $i_{qw}$ and $i_{dw}$. The current phase angle $\Phi_i$ of the current vector $\hat{i}_s$ is obtained from said load angle $\epsilon_w$ and the integral of the stator frequency $f_1$. Said current phase angle $\Phi_i$ and the quantity $\hat{i}_w$ are then used to form for example a three phase, sinusoidal reference parameter signal $i_{Rw}$, $i_{Sw}$ and $i_{Tw}$ with the aid of a reference parameter system generator 48.

It is possible for measurements to be used to regulate the electric motor in order to estimate and control the speed, supplementing existing safety engineering, or as safety engineering measures. Examples of such measurements for calculating speed are current and/or voltage values of the electric motor, it being possible to energize a model in a drive controller or drive regulator with the aid of such measurements. Such models are used both in electric motors operated without transducers and in electric motors that are controlled with the aid of a field oriented regulation. This estimated speed values can be used to monitor the transducer signal. By this means it is an easy matter to detect not only a coupling failure but also a transducer error in the transducer electronics or even in the mechanical system of the transducer itself. Monitoring for transducer errors can be greatly simplified by referring to a model of the electric motor which is already being used in a drive controller and/or drive regulator.

Figure 2:
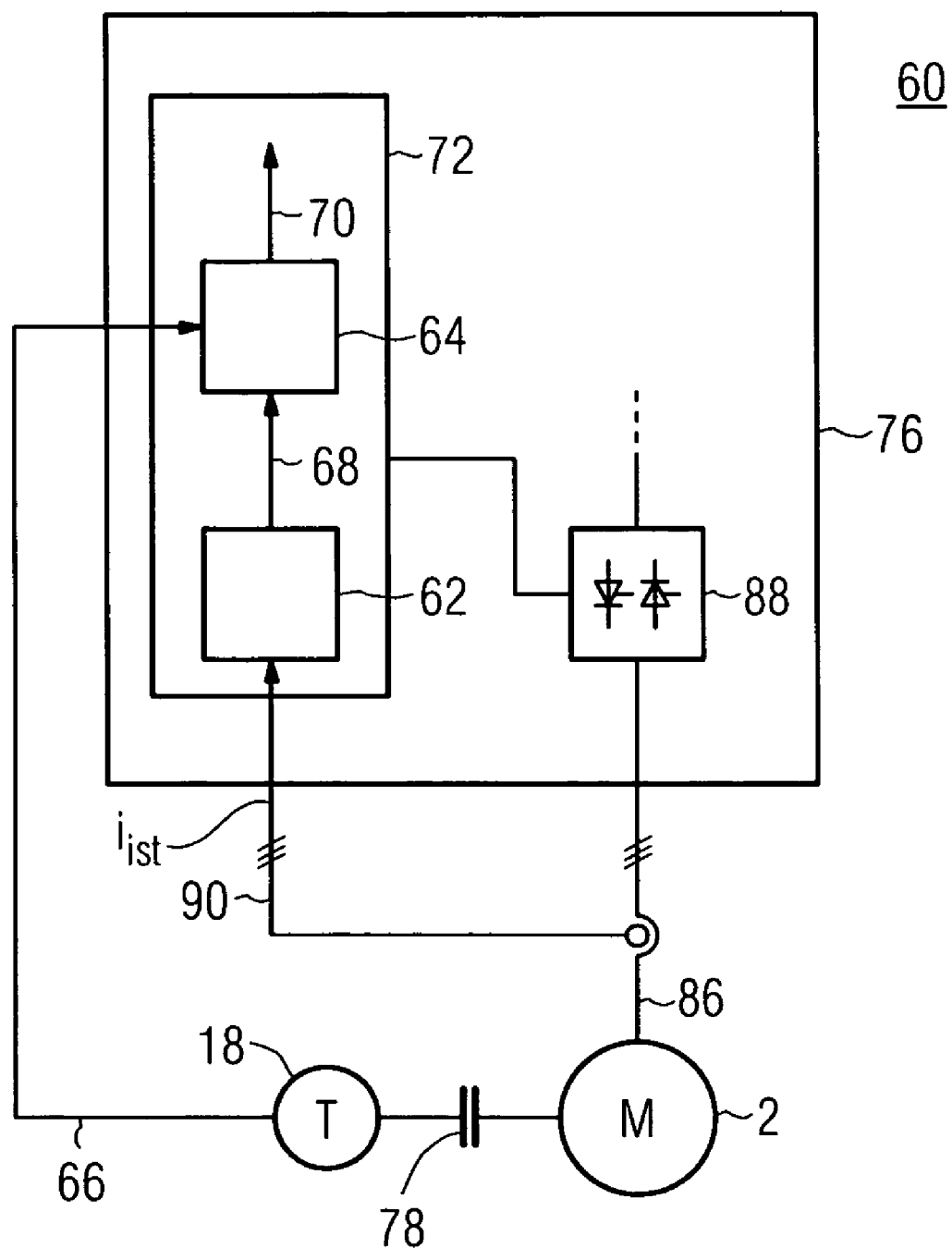

FIG. 2 shows a drive device 60. This has a rectifier device 76 and an electric motor 2. In order to detect the speed of the electric motor 2, a transducer 18 (speed indicator) is connected to the electric motor 2 via a coupling 78. The transducer 18 is connected to the rectifier device 76 via a data link, thus providing the transmission of a transducer signal 66 to the rectifier device 76. The rectifier device 76 has a device for control and/or regulation 72. Actual values $i_{r,s,t}$ are transmitted to said device for controlling and/or regulating the electric motor 2. For this purpose current converters are provided, for example, to measure the current from the power cables 86 supplying the electric motor 2. The power cables 86 are connected to the rectifier device 76, said rectifier device having a power section 88. The device for control and/or regulation 72 has an apparatus for field oriented regulation 62. The actual current values 90 are processed in said apparatus 62. A parameter 68 which can be compared with the transducer signal 66 by means of a comparator device 64 can be calculated from the field oriented regulation. This comparison then results in the generation of an error signal if said comparison leads to the conclusion that there is an error in the transducer 18 or the coupling 78.

The invention claimed is:

1. A drive device of an electric motor, comprising:
a field oriented control device;
a transducer arranged on the electric motor;
a comparator device configured to compare a transducer signal of the transducer with a calculated speed parameter of the field oriented control device,
wherein an actual value of a torque-forming current component and a reference value of a torque-forming current component based on the actual value of the torque-forming current component is present in an actual speed value model for calculating the speed parameter,
wherein the comparator device is configured to recognize a transducer error or a coupling error, and
wherein the comparator device is integrated into a control unit of a rectifier.

2. The drive device as claimed in claim 1, wherein the comparator device compares speed dependent parameters.

3. A drive device of an electric motor, comprising:
a field oriented control device,
a transducer arranged on the electric motor;
a comparator device configured to compare a transducer signal of the transducer with a calculated speed parameter of the field oriented control device,
wherein an actual value of a torque-forming current component and a reference value of a torque-forming current component based on the actual value of the torque-forming current component is resent in an actual seed value model for calculating the seed parameter,
wherein the comparator device is configured to recognize a transducer error and a coupling error, and
wherein the comparator device is integrated into a control unit of a rectifier.

4. The drive device as claimed in claim 3, wherein the comparator device compares speed dependent parameters.

5. A method for operating a drive device having an electric motor, a rectifier, a field oriented control device and a transducer, comprising:
providing a comparator device configured to compare a transducer signal of the transducer with a seed parameter of the field oriented control device;
calculating the speed parameter by an actual value of a torque-forming current component and a reference value of a torque-forming current component based on the actual value of the torque-forming current component, the speed parameter being calculated by an actual speed value model,
transmitting the transducer signal to the comparator device;
comparing the transducer signal with the calculated speed parameter such that a transducer error is recognized,
wherein the comparator device is integrated into a control device of the rectifier and the comparing of the different signals is performed by the control device.

6. The method as claimed in claim 5, further comprising:
comparing the transducer signal with the calculated speed parameter such that a coupling error is recognized, wherein the drive device has a coupling for the transducer.

7. The method as claimed in claim 5, wherein the comparator device is configured to compare speed dependent parameters with one another.

8. The method as claimed in claim 6, wherein the comparator device is configured to compare speed dependent parameters with one another.

9. The method as claimed in claim 5, wherein the comparator device is activated with effect from a minimum speed.

10. The method as claimed in claim 6, wherein the comparator device is activated with effect from a minimum speed.

11. The method as claimed in claim 7, wherein the comparator device is activated with effect from a minimum speed.

12. The method as claimed in claim 5, wherein an illegal deviation between two compared parameters is detected by the comparator device and an emergency cutoff is activated.

13. The method as claimed in claim 6, wherein an illegal deviation between two compared parameters is detected by the comparator device and an emergency cutoff is activated.

14. The method as claimed in claim 7, wherein an illegal deviation between two compared parameters is detected by the comparator device and an emergency cutoff is activated.

15. The method as claimed in claim 9, wherein an illegal deviation between two compared parameters is detected by the comparator device and an emergency cutoff is activated.

* * * * *

UNITED STATES PATENT AND TRADEMARK OFFICE
CERTIFICATE OF CORRECTION

PATENT NO. : 8,143,827 B2
APPLICATION NO. : 12/311148
DATED : March 27, 2012
INVENTOR(S) : Jürgen Olomski Page 1 of 1

It is certified that error appears in the above-identified patent and that said Letters Patent is hereby corrected as shown below:

In claim 3, col. 8, line 10, replace "resent" with --present--.
In claim 3, col. 8, line 10, replace "seed" with --speed--.
In claim 3, col. 8, line 11, replace "seed" with --speed--.
In claim 5, col. 8, line 22, replace "seed" with --speed--.

Signed and Sealed this
First Day of January, 2013

David J. Kappos
*Director of the United States Patent and Trademark Office*